(12) United States Patent
Gluzberg et al.

(10) Patent No.: US 9,158,414 B1
(45) Date of Patent: Oct. 13, 2015

(54) SYSTEM AND METHOD FOR INDICATING A SELECTED FEATURE OF AN INTERACTIVE DIGITAL MAP

(71) Applicant: GOOGLE INC., Mountain View, CA (US)

(72) Inventors: Eugene Gluzberg, New York, NY (US); Darren Willis, Tokyo (JP); Zoltan Szego, Tokyo (JP); Xinmei Cai, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 77 days.

(21) Appl. No.: 14/015,221

(22) Filed: Aug. 30, 2013

Related U.S. Application Data

(60) Provisional application No. 61/844,068, filed on Jul. 9, 2013.

(51) Int. Cl.
*G06F 3/041* (2006.01)

(52) U.S. Cl.
CPC .................................... *G06F 3/0418* (2013.01)

(58) Field of Classification Search
None
See application file for complete search history.

(56) References Cited

U.S. PATENT DOCUMENTS

| 8,259,692 | B2 | 9/2012 | Bajko | |
|---|---|---|---|---|
| 2008/0279452 | A1* | 11/2008 | Keane et al. | 382/173 |
| 2010/0008337 | A1 | 1/2010 | Bajko | |
| 2011/0010668 | A1* | 1/2011 | Feldstein et al. | 715/822 |
| 2011/0167058 | A1* | 7/2011 | van Os | 707/722 |
| 2012/0316782 | A1* | 12/2012 | Sartipi et al. | 701/455 |
| 2013/0138336 | A1 | 5/2013 | Zaid et al. | |
| 2014/0026088 | A1* | 1/2014 | Monte | 715/765 |
| 2014/0109219 | A1* | 4/2014 | Rohrweck et al. | 726/19 |

FOREIGN PATENT DOCUMENTS

WO  WO-2009/130729 A2  10/2009

* cited by examiner

*Primary Examiner* — Jason Olson
*Assistant Examiner* — Krishna Neupane
(74) *Attorney, Agent, or Firm* — Marshall, Gerstein & Borun LLP

(57) ABSTRACT

A radius parameter may be included with mapping data requests resulting from "longpress" fingertip selection actions on client computing devices including touch screen display interfaces. The radius parameter may be based on the approximate size of a user's finger in pixels. Based on a current zoom level and/or altitude and a latitude, the radius may be used with a finger tip size to determine how far away a location on the screen from the finger tip center is. A remote mapping server may use the radius as a distance limit for performing a snapping action. For example, if the best candidate for a feature snap is outside the range of the longpress radius, then the feature snap may be abandoned, and the remote mapping server returns a dropped pin response to the client. The user may then customize the dropped pin for sharing or other actions.

20 Claims, 7 Drawing Sheets

SYSTEM AND METHOD FOR INDICATING A SELECTED FEATURE OF AN INTERACTIVE DIGITAL MAP

CROSS REFERENCE TO RELATED APPLICATIONS

This application claims the benefit of U.S. Provisional Patent Application No. 61/844,068 that was filed on Jul. 9, 2013 the disclosure of which is hereby incorporated herein by reference in its entirety for all purposes.

FIELD OF TECHNOLOGY

The present disclosure relates generally to systems and methods for indicating a selected feature on an interactive digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed mapping systems illustrate a variety of interactive features to accurately represent geographic areas. Users may interact with map features to indicate selecting a feature by placing another feature (e.g., a "drop pin") on or near the selected feature to indicate a user selection of that feature. Past system relied on pointer actions using a mouse or other device to identify and select interactive map features. With the touch screen devices becoming more prevalent, a user often uses a fingertip to identify or select interactive features within a digital map display. However, a finger tip is inherently less precise than a mouse pointer. Varying fingertip size and other positional flaws in using a fingertip often result in unintended results such as the user selecting an interactive map feature he or she did not intend to select, unintentionally panning a viewed map page, and other problems.

When a user attempts to select a map feature (i.e., a "longpress"), the mapping application may "snap" to a nearby feature, such as a local business, if the coordinate at the center of the fingertip area on the touch screen is sufficiently close to the center of a feature. However, snapping actions sometimes result in placing a drop pin at a place too far away from where the user has longpressed. In another typical snapping action, past systems would drop the pin at the longpress location on the touchscreen, but have the user interact with a feature that is really located elsewhere, giving rise to unexpected and unwanted behavior.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

To reduce unwanted or unexpected behavior during a longpress selection action with an interactive map, a radius parameter may be included with mapping data requests resulting from "longpress" fingertip selection actions. The radius parameter may be based on the approximate size of a user's finger in pixels. Based on a current zoom level and/or altitude and a latitude, the method may use the radius and finger tip size to determine how far away a location on the screen from the finger tip center is, and pass this data through to a remote mapping server. The radius may be used as a distance limit for performing a snapping action. For example, if the best candidate for a feature snap is outside the range of the longpress' radius, then the feature snap may be abandoned, and the remote mapping server returns a "Dropped Pin" response to the client. The user may then customize the dropped pin for sharing or other actions.

For an interactive map, a system, method, and computer-executable instructions may receive drop pin request data and a zoom level and/or altitude for a gesture. The gesture may interact with mapping data received and displayed at a client computing device. The drop pin request data may include a fingertip radius and a fingertip center location within a fingertip contact area for the gesture. The fingertip radius may measure a number of pixels from the fingertip center location to an outer edge of the fingertip contact area. The number of pixels may be translated into a snapping distance limit using the zoom level and/or altitude. The snapping distance limit may correspond to a distance on the displayed mapping data from the fingertip center location. A distance between a map feature location for a map feature of the mapping data displayed at the client computing device and the fingertip center location may be compared. Then, drop pin graphical data may be placed at the map feature location when the distance between the map feature location for the map feature displayed at the client computing device and the fingertip center location is less than the snapping distance limit.

According to another embodiment, a computing apparatus may indicate a selected feature on a digital map. The apparatus may include receiving means to receive drop pin request data and a zoom level and/or altitude for a gesture. The gesture may interact with mapping data received and displayed at a client computing device and the drop pin request data may include a fingertip radius and a fingertip center location within a fingertip contact area for the gesture. The fingertip radius may measure a number of pixels from the fingertip center location to an outer edge of the fingertip contact area. The apparatus may also include translating means for translating the number of pixels into a snapping distance limit using the zoom level and/or altitude. The snapping distance limit may correspond to a distance on the displayed mapping data from the fingertip center location. The apparatus may still further include comparing means to compare a distance between a map feature location for a map feature of the mapping data displayed at the client computing device and the fingertip center location and then placing means to place drop pin graphical data at the map feature location when the distance between the map feature location for the map feature displayed at the client computing device and the fingertip center location is less than the snapping distance limit.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In a distributed digital mapping system, a radius parameter may be added to data requests from client devices to the remote mapping server where a user touches a displayed map on a client device that includes a touch-sensitive display. The radius parameter may be based on the approximate size of a user's finger in pixels, a distance away from the center of a fingertip area on the screen, etc (e.g., 44 pixels or any other suitable number of pixels or other units used in known human interface guidelines). Based on a current zoom level and/or altitude and a latitude, the system may convert the screen radius distance to a map distance (i.e. meters), and may then pass the meter value through to the mapping server to fulfill the requests. Typically, the request is a drop pin request sent by the client device after determining the long press gesture at the client device. The server may then use the radius as a distance limit for feature snapping. For example, if the best candidate for a feature snap is outside the range of the radius, then the feature snap is abandoned, and the system returns a default response to the client (e.g., a 'Dropped Pin' response). A dropped pin location may be one that cannot reasonably snap to a known feature. The dropped pin may include a editable title that may also indicate additional information such as nearby features to the dropped pin (e.g., "Near: Roppongi Hills") where the pin is near that location, but outside the radius so that a snapping action to that location would not be an expected result for the user.

System Overview

Figure 1:
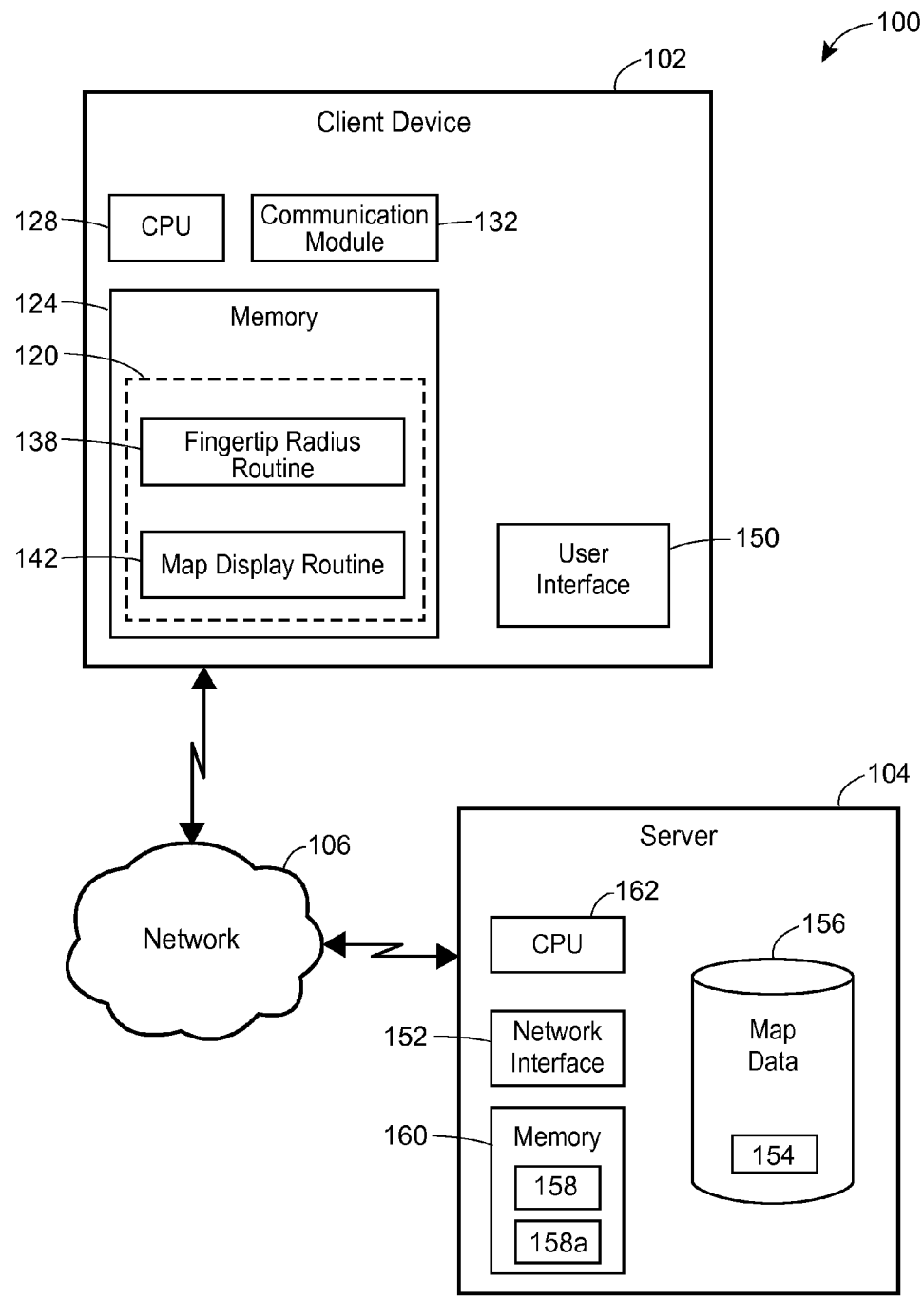
FIG. 1 illustrates an example computing system to indicate a position on a digital interactive map using a fingertip.

FIG. 1 illustrates an example computing system 100 in which a user's fingertip selection of a feature on a map displayed on a client computing device may be snapped to a known or "best candidate" feature. The example computing system 100 includes a client device 102 and a server 104 communicatively coupled to a network 106. The network 106 may be a proprietary network, a secure public internet, a virtual private network or some other type of network, such as dedicated access lines, plain ordinary telephone lines, satellite links, combinations of these, etc. Where the network 106 comprises the Internet, data communications may take place over the network 106 via an Internet communication protocol.

In some embodiments, the client device 102 includes a mapping application 120 stored in a memory 124 and executed by a CPU 128. The mapping application 120 may include instructions to determine a fingertip radius corresponding to a request to associate a drop pin graphic element with mapping data for a feature displayed on a display device of the client device. The mapping application may also include instructions to receive map data, feature snapping data, and/or drop pin data from the server 104 in response to data requests including the fingertip radius via a communication module 132, as well as instructions to display map content to a user of the client device 102. For example, the map content may include feature snapping data, feature data, drop pin date, point of interest information, geographic query matches, indications of traffic, advertisements, etc.

The mapping application 120 may utilize a fingertip radius routine 138 to tag or display content related to map features based on a proximity of the user's fingertip to a feature displayed within the map upon selection by the user. For example, the fingertip radius routine 138 may include instructions for execution by the processor 128 to analyze data received from a user interface module 150 upon a user touching the client device display while a map display routine 142 causes the processor 128 to execute instructions to display map data where the client device includes a touch screen type of display.

In some embodiments, the fingertip radius routine 138 also includes instructions to determine a type of gesture corresponding to the user's interaction with the client device touch screen display. The techniques described herein need not be limited to finger gestures applied a touch screen, and can also be used with stylus operations, three-dimensional gestures, etc. Gestures may be mapped to various other functions of an application that is currently executing on the client device. For example, a double-tap gesture may be mapped to a zoom-in function of the mapping application 120, while a long-press gesture may be mapped to a feature selection function of the mapping application 120. The instructions to determine the type of gesture may also include instructions to determine an amount of time a user's finger or other suitable pointer contacts the touch screen display surface. The module instructions 138 may include one or more variables that associate a contact time with a long-touch gesture type where an amount of contact time exceeds a threshold amount.

The routine 138 may also include instructions to determine a fingertip radius for a long-press gesture. A long-press gesture caused by a fingertip contact with the display surface may include an area of contact with the surface. The routine 138 may use the area to determine the fingertip radius. The routine 138 may also include other instructions to determine a zoom level, an altitude, latitude, geographic location, and other data related to the map displayed at the client device 102.

In response to a map content request from the client 102, the server 104 may include instructions to transfer map content 154 to the client device 102 via the network interface 152. The map content 154, may be stored in a map database 156 and include map feature data, such as points of interests, geometric shapes, geographic coordinates, etc., for example. In addition, the server 104, or any other suitable server, may include supplementary information associated with additional map data layers, such as traffic, weather, accident, etc. information, to the client device 102, in some embodiments. For example, the server 104 may retrieve information indicating current traffic conditions from a third party server (not shown) and send at least some of the information indicating current traffic conditions to the client device 102 (e.g. along with the map content 154).

In some other embodiments, a server-side snapping routine 158 to determine a snapping distance limit 158a may be stored in a server memory 160 and executed by a server CPU 162. The routine 158 may include instructions that are executable by the processor 162 to modify the map content 154 displayed at the client in response to a long press gesture. For example, the snapping routine 158 may include instructions to associate a drop pin or other graphic element with a map feature displayed at the client device in response to drop pin request data received at the client device after the client device receives the long press gesture. Further, the mapping application 120 at the client device 102 may include further instructions to modify or allow a user to customize a drop pin associated with a displayed graphic element, as described herein.

Figure 2A:
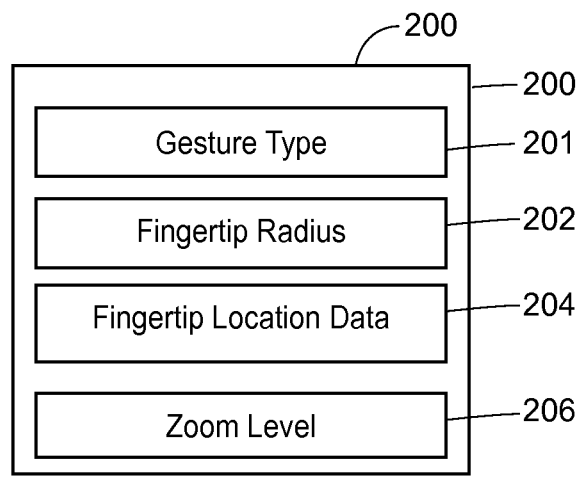
FIGS. 2a and 2b illustrate examples of data structures to pass mapping data requests and responses between a backend mapping server and a client computing device.

FIG. 2a illustrates a block diagram for one embodiment of drop pin request data 200 sent from the client computing device 102 to the mapping server 104. Each drop pin request 200 may correspond to a data structure including a single electronic message or a series of electronic messages sent from the client device 102 to the server 104, depending on the scenario and/or embodiment. The drop pin request 200 may include various data that may be used by the system 100 to generate, associate, and display a drop pin element with a map feature. While the drop pin request 200 of FIG. 2 illustrates several types of data that may be used to generate and display a snapped drop pin element, the systems and methods described herein may use all or only some of the types of data.

The drop pin request data 200 may be sent from the client device 102 to the server 104 in one or more messages in response to the fingertip radius routine 138 executing one or more instructions to identify a gesture type 201 (e.g., a long press gesture 201) and determine a fingertip radius 202 for the identified long press gesture. In some embodiments, the request 200 may include a fingertip radius 202 determined by the fingertip radius routine 138. Additionally, the drop pin request data 200 may include fingertip location data 204 indicating a center geographic location, latitude, or other data for the radius 202, and a current zoom level 206 at which the mapping module 124 displays the map data at the client device 102. In some embodiments, an altitude of the geographic location corresponding to the drop pin location may be used instead of or in addition to the zoom level 206.

Figure 2B:
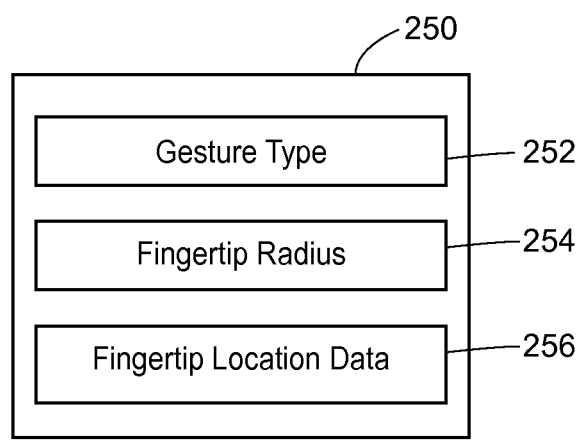

FIG. 2b illustrates a block diagram for one embodiment of a response 250 to the drop pin request data 200 sent from the server 104 to the client computing device 102. Each response 250 may correspond to a data structure including a single electronic message or a series of electronic messages sent from the server 104 to the client device 102, depending on the scenario and/or embodiment. The response 250 may include various data that may be used by the system 100 to generate, associate, and display a drop pin element with a map feature displayed at the client device 102 that a user selects with a long press gesture. While the response 250 of FIG. 2b illustrates several types of data that may be used to generate and display a snapped drop pin element, the systems and methods described herein may use all or only some of the types of data. In some embodiments, the response may include drop pin graphical data 252, drop pin location data 254, and drop pin text data 256. The mapping module 120 of the client computing device 102 may include instructions to display a drop pin within the touch screen display of the client device 102 using the response data 250.

Computer-Implemented Method and Instructions

Figure 3:
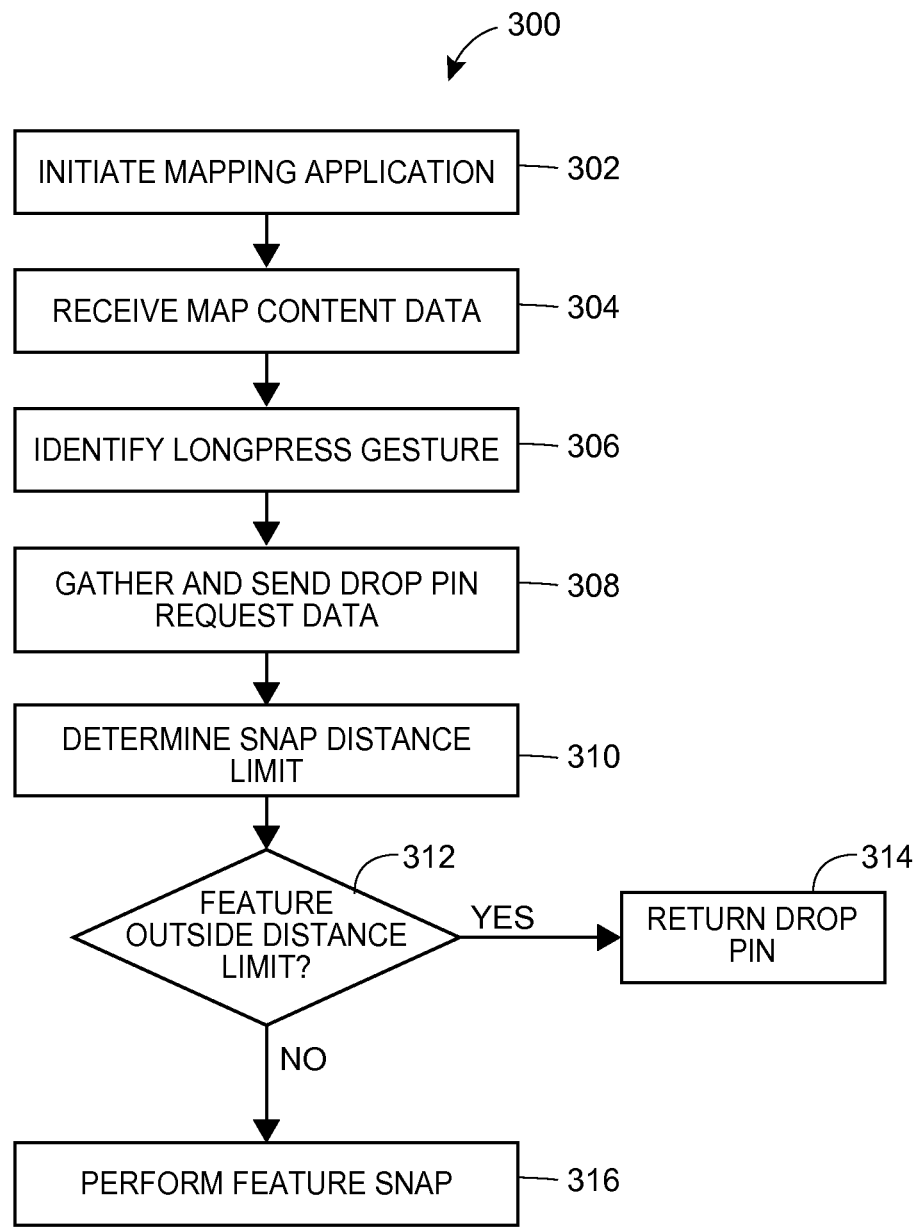
FIG. 3 is a flow diagram of an example method for utilizing the system of FIG. 1 to indicate a position on a digital interactive map.

FIG. 3 illustrates a flow diagram of an example method 300 for indicating a selected feature on an interactive digital map. The method 300 may be implemented in the computing system 100, for example. FIGS. 4a-d illustrate examples of a touchscreen interface that may be used with the systems and methods described herein.

At block 302, an instruction stored in the memory 124 may be executed on the processor 128 to initiate a mapping application, such as mapping application 120. For example, the mapping application 120 may be initiated by a user clicking or tapping on a mapping application icon displayed via the user interface 150. Alternatively, a user may initiate a mapping application by navigating to a web page via a web browser application executed on the client device.

At block 304, the server 104 may execute an instruction to receive a request for mapping data sent from the client device 102 that initiated the mapping application at block 302. From the client device, the request for mapping data may include location data identifying one or more geographic locations corresponding to mapping data 154 stored at the mapping server 104. In response to receiving the request from the client, block 304 may also execute an instruction to identify mapping data 154 at the server 104 corresponding to the received data, and send the mapping data to the client device 102 via a computer network, such as the computer network 106. The client device 102 may receive mapping data 154 from the server 104, and, in certain embodiments, the server 104 may send the mapping data 154 to the client device 102 in response to a geographic query. A user of the client device 102 may enter, via the user interface 150, a geographic query, such as a geographic location query, a navigation query, a traffic query, etc. In response to communication of the query from the client device 102 to the server 104, the server 104 may send the client device 102 relevant portions of the mapping data 154.

Figure 4A:
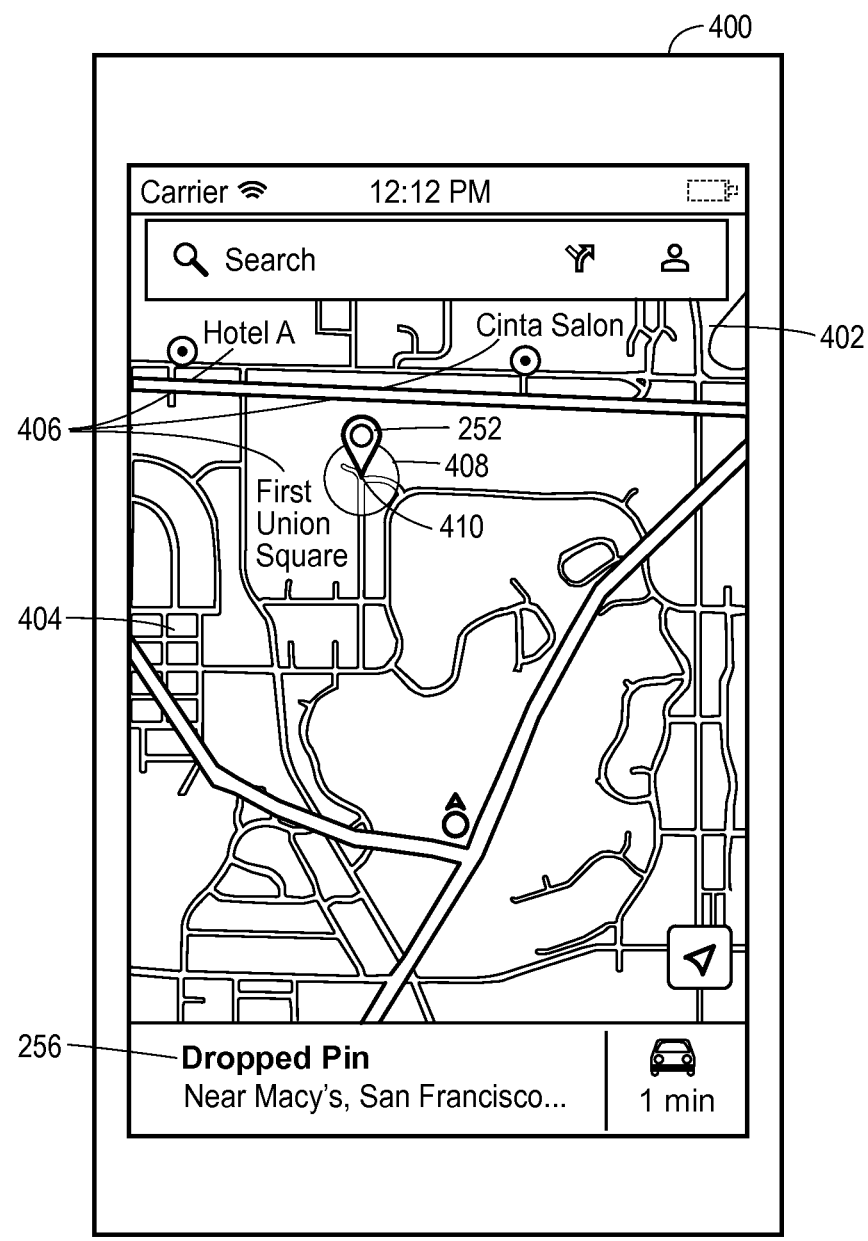
FIGS. 4a, 4b, and 4c illustrate examples of a computing device display that may be used to indicate a position on a digital interactive map using a fingertip.

At block 306, the method may identify a longpress gesture 201. In some embodiments, the client device processor 128 may execute an instruction of the fingertip radius routine 138 to identify the longpress gesture 201. As described above, when an object such as a user's fingertip contacts a point on a touch screen surface displaying the received mapping data and the fingertip contacts the surface for at least a threshold amount of time, the routine 138 may identify a longpress gesture 201. With reference to FIG. 4a, a computing device 400 may include a touch screen display 402 that shows mapping data 404 including various features 406. A longpress gesture 201 may include a contact area 408.

At block 308 in response to identifying the longpress gesture 201, the method 300 may execute an instruction to gather drop pin request data 200 at the client 102 and send the drop pin request data 200 to the server 104. As described above, drop pin request data 200 sent to the server 104 may include a fingertip radius 202, fingertip location 204, and a currently-displayed zoom level 206 and/or altitude.

At block 310, the method 300 may execute an instruction to determine a snapping distance limit 158a on the touch screen display using the received drop pin request data. In some embodiments, the server-side snapping routine 158 may cause the processor 162 to execute an instruction to translate the length of the fingertip radius 202 in pixels into a distance on the map displayed at the client computing device at the current zoom level and/or altitude. In other embodiments, the server-side snapping routine 158 may cause the processor 162 to execute an instruction to determine a location that is the fingertip radius 202 away from the center of the fingertip. For example, where the fingertip radius is forty-four pixels, the mapping data displayed on the touch screen may depict two-hundred meters for each forty-four pixels at the currently-displayed zoom level and/or altitude and latitude. Thus, the distance limit 158a for a feature to which the method 300 may snap the display may be two-hundred meters away from the center of the fingertip location.

At block 312, the method 300 may determine whether the best candidate for a feature is within the range of the snapping distance limit 158a. A best candidate feature may be a feature 406 that is within the range of the snapping distance limit 158a and includes one or more other characteristics that make it a more likely choice for identification than other, similar features 406 within the limit 158a. For example, a best candidate feature may be a feature 406 that is closest to a center 410 of the contact area 408, that includes characteristics that are similar to other features 406 the user has recently or historically selected, or other characteristics (e.g., type of store, building, service, etc.) that are similar to other map features of a user map feature selection history.

Where no features 406 within the limit 158a include a characteristic to make it a best candidate feature (or a best candidate feature is outside the limit 158a), then at block 314, the method 300 may execute an instruction to return a response 250 to the drop pin request data 200 including the graphical data 252, the location data 254, and the text data 256. When no features 406 are best candidates, the location data 254 for the drop pin response 250 may include a center point for the contact area of the longpress gesture. In some embodiments, the text data 256 may include information corresponding to features 406 that are outside the limit 158a, but may be best candidate features if they were within the limit distance 158a. For example, where no features 406 were located within the distance limit 158a, the text data 256 may include information stating that the dropped pin location 254 is near another feature 406 that is closest to the location 254 or shares another characteristic that might make it a likely best candidate feature 406.

Figure 4B:
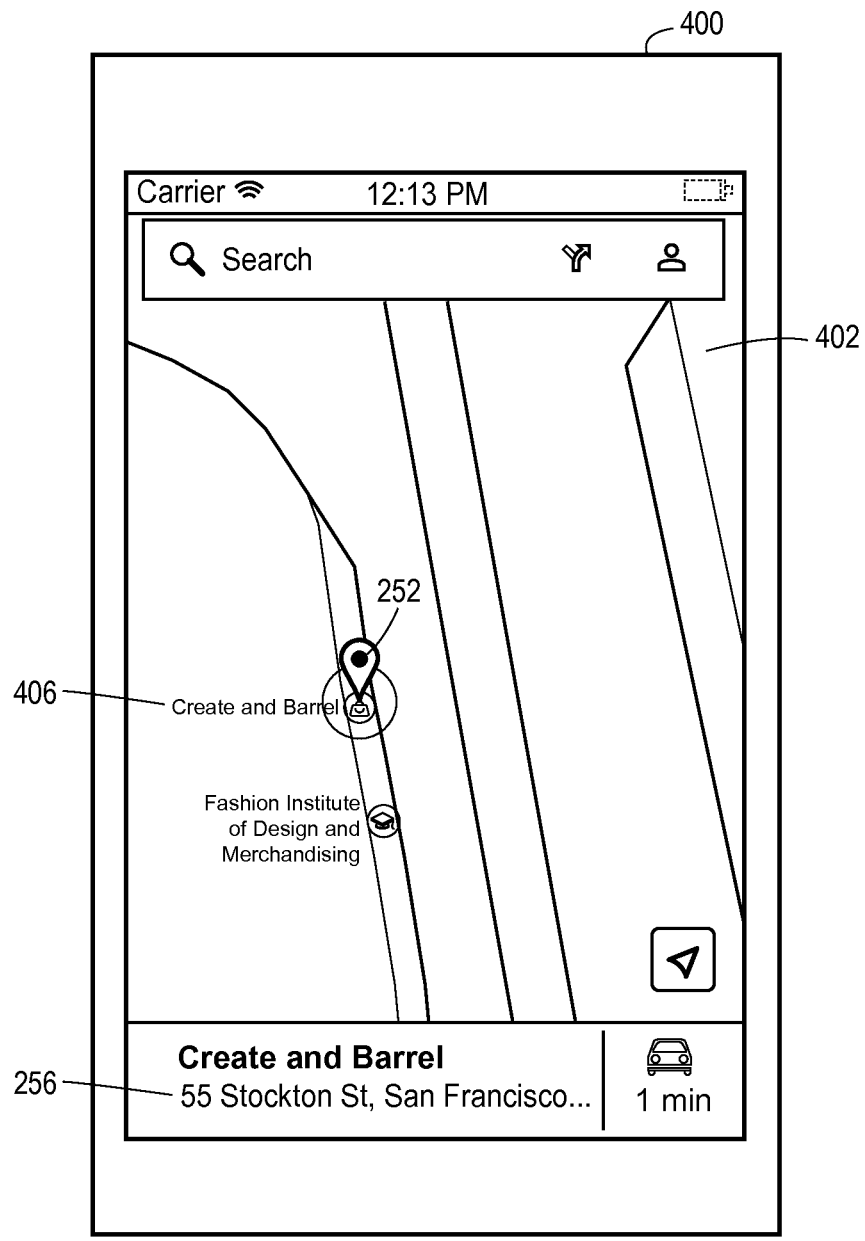

With reference to FIG. 4b, when the method 300 determines that a feature 406 is within the limit 158a and includes a characteristic to make it a best candidate feature, then at block 316, the method 300 may execute an instruction to return response data 250 corresponding to the feature 406. For example, the drop pin graphical data 252 may be placed on the touch screen display 402 using location data 254 corresponding to the feature 406. While the location data 254 corresponding to the feature 406 may not be at the center of the longpress gesture 201 contact area on the display 402, the graphical data 252 may indicate the best candidate feature 406 that is within range of the limit distance 158a.

Figure 4C:
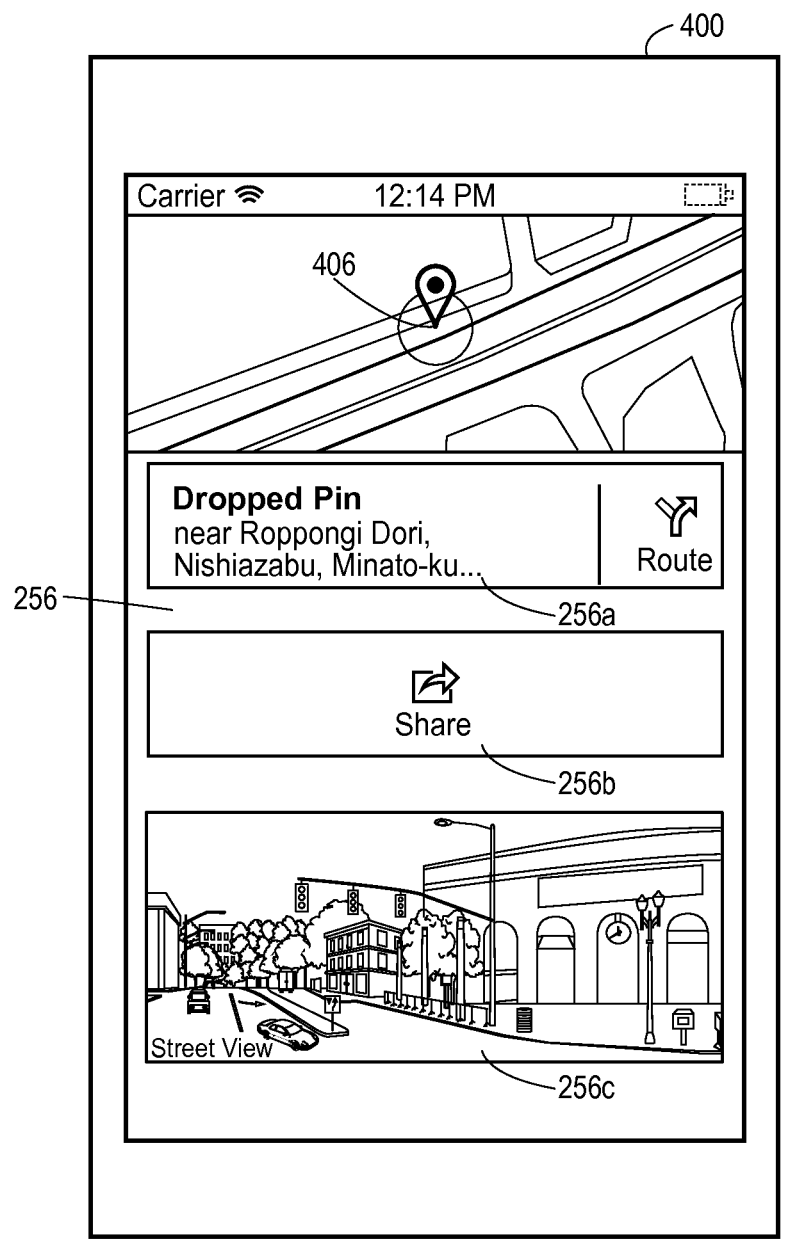

With reference to FIG. 4c, in other embodiments, the text data 256 may include additional details for the identified feature 406. For example, the data 256 may include additional address or location details 256a, functions 256b (e.g., a "share" function to forward the drop pin response data 250 with a social networking application, forward the data 250 by e-mail or text message, etc.), or views that correspond to an area surrounding the drop pin location 254.

In further embodiments, the system and method described herein may be used with multi-level buildings. For example, the request data 200 may include building level data. The method 300 may then determine whether a best candidate feature would be in the same level as the level sent with the request data 200. Other features of the embodiments described herein may be to find a geocode or address of a particular feature selected by a longpress gesture or to explore nearby businesses while navigating a map. Other features may allow the user to drop a pin to remember a parking spot within a large lot, to mark a particularly interesting spot for future reference (e.g., whale watching, snorkeling, scenic vistas, etc.), or to share a dropped pin with a friend for a meeting location. For dropped pins that do not correspond to a best candidate feature (i.e., a pin resulting from block 314), the method 300 may allow the drop pin text data 256 to be edited to indicate a user's purpose for dropping the pin. Thus, a radius parameter may be included with mapping data requests resulting from "longpress" fingertip selection actions. The embodiments described herein may use the radius and finger tip size to determine how far away a location on the screen from the finger tip center is, and pass this data to a remote mapping server. The radius may be used as a distance limit for identifying a feature within a displayed map. The user also customize the dropped pin for sharing or other actions.

Example Computing Environment

Figure 5:
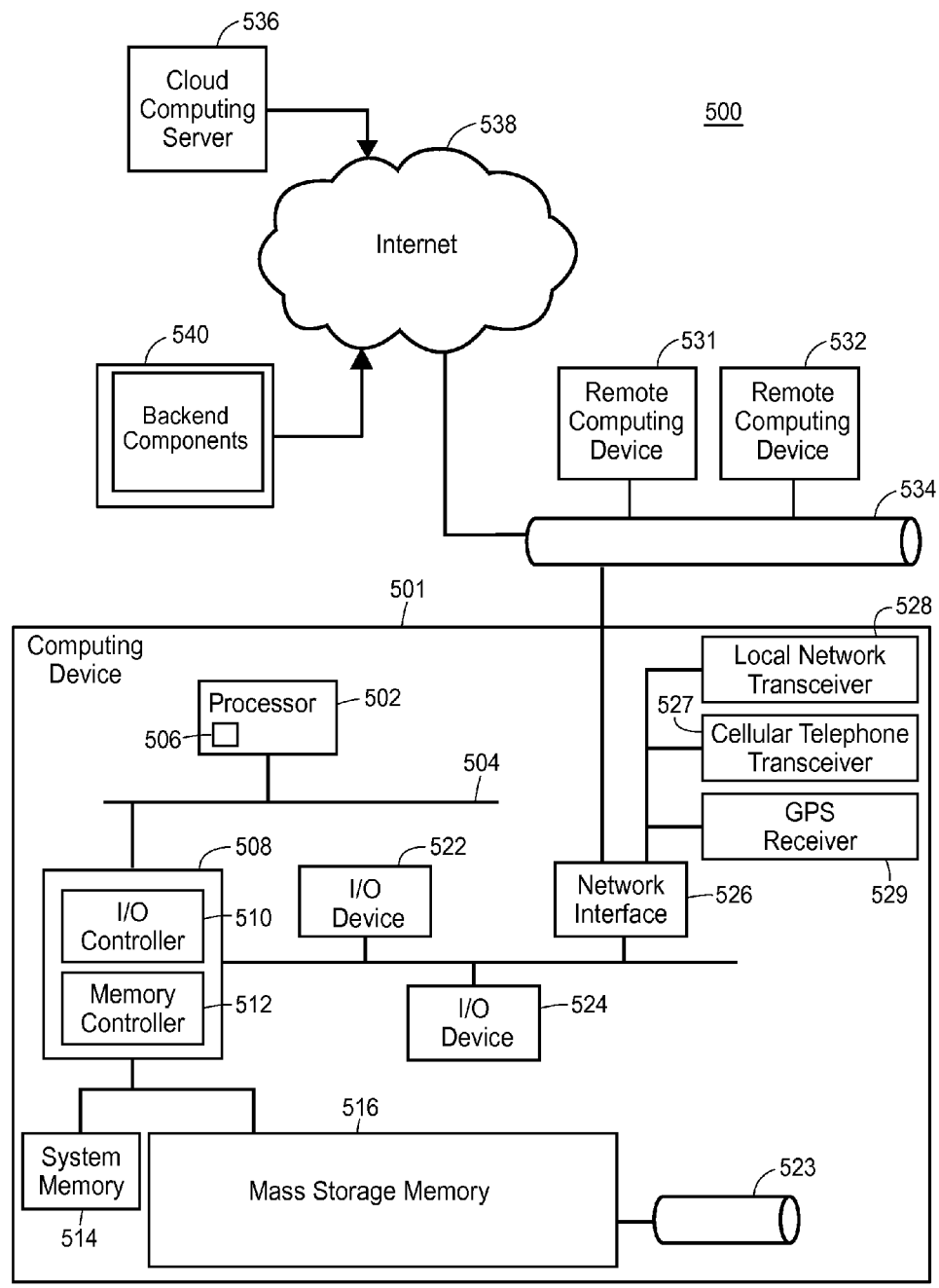
FIG. 5 is high-level block diagram of a computing environment that implements a system and method for indicating a position on a digital interactive map using a fingertip.

FIG. 5 is a high-level block diagram of an example computing environment for a mapping system 500 having a computing device 501 that may be used to implement the system 100 in which a user's fingertip selection of a feature on a map displayed on a client computing device may be snapped to a known or "best candidate" feature. The computing device 501 may include a mobile device (e.g., a cellular phone, a tablet computer, a smart watch, a head mounted display, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the data structures of FIGS. 2a and 2b, the method of FIG. 3, the displays of FIGS. 4a, 4b, and 4c, etc. Although the example mobile mapping system 500 is described below as including a plurality of peripherals, interfaces, chips, memories, etc., one or more of those elements may be omitted from other example processor systems used to implement and execute the example system 100. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 512 and a peripheral input/output (I/O) controller 510. As is well known, a chipset typically provides I/O and memory management functions as well as a plurality of general purpose and/or special purpose registers, timers, etc. that are accessible or used by one or more processors coupled to the chipset 508. The memory controller 512 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement one or more modules (including instructions implementing the methods illustrated in the method 300 of FIG. 3), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the fingertip radius routine 138, the server-side snapping routine 158, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a database 523 storing GPS data, graphics, mapping data, route data, account data, demographic data, and other data for use by the mapping module 104, the mapping module 117, the route module 122 as well as a database interface module through which the mapping module 104, the mapping module 117, the route module 122, etc., may access the GPS data, graphics, etc. received from a mapping data system 112 or other data system.

The peripheral I/O controller 510 performs functions that enable the processor 502 to communicate with peripheral input/output (I/O) devices 522 and 524, a network interface 526, a cellular network transceiver 527, a local network transceiver 528, and a GPS receiver 529 (via the network interface 526) via a peripheral I/O bus 530. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, a touch screen, an eye tracker, a voice recognition module, etc.), etc. The I/O devices 522 and 524 may be used with various modules, routines, blocks, etc., described herein to receive GPS data from the GPS receiver 529, send the GPS data to the backend components of the system 100, render, and display maps and user interfaces as described in relation to the figures. A cellular network transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions.

In operation, the computing device 501 may be able to periodically poll for visible wireless network transmitters (both cellular and local network) on a periodic basis. Such polling may be possible even while normal wireless traffic is being supported on the computing device 501. The network interface 526 may be, for example, an Ethernet device, an asynchronous transfer mode (ATM) device, an 802.11 wireless interface device, a DSL modem, a cable modem, a cellular modem, etc., that enables the system 100 to retrieve mapping data and route data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The remote computing devices 530 and 532 may communicate with the computing device 501 over a network link 534. For example, the computing device 501 may receive mapping data created by a mapping application executing on a remote computing device 531, 532. In some embodiments, data and or computer readable instructions may be retrieved by the computing device 501 from a cloud computing server 536 via the Internet 538.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a tangible machine memory (e.g., a computer memory). These algorithms or symbolic representations are examples of techniques used by those of ordinary skill in the data processing arts to convey the substance of their work to others skilled in the art. As used herein, an "algorithm" or a "routine" or a "block" is a self-consistent sequence of operations or similar processing leading to a desired result. In this context, algorithms, routines, blocks, and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment or embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for utilizing secure private data models to customize map content through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for indicating a selected feature on a digital map, the method comprising:
   receiving drop pin request data and a zoom level or altitude for a gesture, the gesture interacting with mapping data received and displayed at a client computing device, the drop pin request data including a fingertip radius and a fingertip center location within a fingertip contact area for the gesture, the fingertip radius measuring a number of pixels from the fingertip center location to an outer edge of the fingertip contact area;
   translating the number of pixels into a snapping distance limit using the zoom level or altitude, the snapping distance limit corresponding to a distance on the displayed mapping data from the fingertip center location;
   comparing a distance between a map feature location for a map feature of the mapping data displayed at the client computing device and the fingertip center location; and
   placing drop pin graphical data at the map feature location when the distance between the map feature location for the map feature displayed at the client computing device and the fingertip center location is less than the snapping distance limit.

2. The computer-implemented method of claim 1, wherein the client computing device includes a touch screen display and the gesture is received at the touch screen display.

3. The computer-implemented method of claim 2, further comprising placing drop pin graphical data at the fingertip center location when the distance between the map feature location for the map feature displayed at the client computing device and the fingertip center location is greater than the snapping distance limit.

4. The computer-implemented method of claim 3, further comprising receiving a request for mapping data, the request including location data identifying one or more geographic locations corresponding to mapping data stored at a mapping server, the mapping data representing map features for display on the client computing device, and sending the corresponding mapping data to the client computing device in response to the request.

5. The computer-implemented method of claim 4, further comprising displaying the received mapping data at the client computing device.

6. The computer-implemented method of claim 5, wherein the gesture is a longpress gesture.

7. The computer-implemented method of claim 6, wherein the longpress gesture includes a contact time that exceeds a threshold.

8. The computer-implemented method of claim 7, wherein the map feature location corresponding to the placed drop pin graphical data is closer to the fingertip center location than other map features within the snapping distance limit of the fingertip center location.

9. The computer-implemented method of claim 7, wherein the map feature corresponding to the placed drop pin graphical data includes one or more characteristics that are similar to other map features of a user map feature selection history.

10. The computer-implemented method of claim 7, wherein receiving drop pin request data and the zoom level or altitude for the gesture further includes receiving building level data, and the placed drop pin graphical data corresponds to a map feature on a same building level.

11. A mapping system configured to indicate a selected feature on a digital map, the system comprising:
   a remote mapping server including a processor and a memory, the memory including instructions executed on the processor to:
   receive drop pin request data and a zoom level or altitude for a gesture, the gesture interacting with mapping data received and displayed on a touch screen display at a client computing device, the drop pin request data including a fingertip radius and a fingertip center location within a fingertip contact area for the gesture, the fingertip radius measuring a number of pixels from the fingertip center location to an outer edge of the fingertip contact area;
   translate the number of pixels into a snapping distance limit using the zoom level or altitude, the snapping distance limit corresponding to a distance on the displayed mapping data from the fingertip center location;
   compare a distance between a map feature location for a map feature of the mapping data displayed at the client computing device and the fingertip center location; and
   place drop pin graphical data at the map feature location when the distance between the map feature location for the map feature displayed at the client computing device and the fingertip center location is less than the snapping distance limit.

12. The mapping system of claim 11, further comprising instructions to place drop pin graphical data at the fingertip center location when the distance between the map feature location for the map feature displayed at the client computing device and the fingertip center location is greater than the snapping distance limit.

13. The mapping system of claim 12, wherein the gesture is a longpress gesture including a contact time that exceeds a threshold.

14. The mapping system of claim 13, wherein:
   the map feature location corresponding to the placed drop pin graphical data is closer to the fingertip center location than other map features within the snapping distance limit of the fingertip center location, and
   the map feature corresponding to the placed drop pin graphical data includes one or more characteristics that are similar to other map features of a user map feature selection history.

15. The mapping system of claim 14, wherein the instructions to receive drop pin request data and the zoom level or altitude for the gesture further includes instructions to receive building level data, and the placed drop pin graphical data corresponds to a map feature on a same building level.

16. A tangible computer-readable medium including non-transitory computer readable instructions stored thereon for indicating a selected feature on a digital map, the instructions to:
   receive drop pin request data and a zoom level or altitude for a gesture, the gesture interacting with mapping data received and displayed on a touch screen display at a client computing device, the drop pin request data including a fingertip radius and a fingertip center location within a fingertip contact area for the gesture, the fingertip radius measuring a number of pixels from the fingertip center location to an outer edge of the fingertip contact area;
   translate the number of pixels into a snapping distance limit using the zoom level or altitude, the snapping distance limit corresponding to a distance on the displayed mapping data from the fingertip center location;

compare a distance between a map feature location for a map feature of the mapping data displayed at the client computing device and the fingertip center location; and place drop pin graphical data at the map feature location when the distance between the map feature location for the map feature displayed at the client computing device and the fingertip center location is less than the snapping distance limit.

17. The tangible computer readable medium of claim 16, further comprising instructions to place drop pin graphical data at the fingertip center location when the distance between the map feature location for the map feature displayed at the client computing device and the fingertip center location is greater than the snapping distance limit.

18. The tangible computer readable medium of claim 17, wherein the gesture is a longpress gesture including a contact time that exceeds a threshold.

19. The tangible computer readable medium of claim 18, wherein:

the map feature location corresponding to the placed drop pin graphical data is closer to the fingertip center location than other map features within the snapping distance limit of the fingertip center location, and the map feature corresponding to the placed drop pin graphical data includes one or more characteristics that are similar to other map features of a user map feature selection history.

20. The tangible computer readable medium of claim 19, wherein the instructions to receive drop pin request data and the zoom level or altitude for the gesture further includes instructions to receive building level data, and the placed drop pin graphical data corresponds to a map feature on a same building level.

* * * * *